US00RE42496E

(19) United States
(12) Reissued Patent
Golliher

(10) Patent Number: US RE42,496 E
(45) Date of Reissued Patent: Jun. 28, 2011

(54) CONTROLLER FOR REMOTE VEHICLES AND CRAFT AND FOR VIRTUAL SUBJECTS

(76) Inventor: Clayton R. Golliher, Los Angeles, CA (US)

(21) Appl. No.: 12/315,816

(22) Filed: Dec. 8, 2008

Related U.S. Patent Documents

Reissue of:
(64) Patent No.: 7,362,234
Issued: Apr. 22, 2008
Appl. No.: 11/218,341
Filed: Aug. 31, 2005

U.S. Applications:
(60) Provisional application No. 60/663,532, filed on Mar. 18, 2005.

(51) Int. Cl.
*G08C 19/00* (2006.01)

(52) U.S. Cl. ..... 340/825.69; 244/189; 341/176; 446/460; 455/95; 463/37; 463/38

(58) Field of Classification Search ..... 340/825.69; 463/37, 38; 446/456, 460; 341/176; 345/158, 345/161; 434/45; 455/95
See application file for complete search history.

(56) References Cited

U.S. PATENT DOCUMENTS 4,107,642 A * 8/1978 Crummett ..... 338/128
4,659,313 A * 4/1987 Kuster et al. ..... 434/45
4,817,950 A * 4/1989 Goo ..... 463/36
5,059,958 A * 10/1991 Jacobs et al. ..... 345/158
6,200,219 B1 * 3/2001 Rudell et al. ..... 463/37
6,371,829 B1 * 4/2002 Kato et al. ..... 446/456
6,597,342 B1 * 7/2003 Haruta ..... 345/157
7,145,551 B1 * 12/2006 Bathiche et al. ..... 345/158
2003/0214428 A1 * 11/2003 Tokita ..... 341/176
2005/0009606 A1 * 1/2005 Murzanski et al. ..... 463/38

* cited by examiner

*Primary Examiner* — Brent Swarthout
(74) *Attorney, Agent, or Firm* — Stephen E. Feldman; Feldman Law Group, P.C.

(57) ABSTRACT

A control system which provides directional control over various real and virtual vehicles, craft and moveable subjects. The control system includes a housing, a controller in the housing having an electronic radio control PC board or an electronic video control PC board and tilt switches which are fixed relative to the housing at preferred orientations. The switches are connected to control terminals of the electronic control PC board. With the tilt switches fixed relative to the housing, orientation of the housing can result in the electronic control PC board transmitting signals to a remote vehicle, craft or virtual subject. Rather than tilt switches, the control system can include pots having shafts orthogonally arranged relative to the housing. The pots are connected to control terminals of the electronic control PC board. Pendulums are fixed to the shafts of the pots. With the pots having shafts orthogonally arranged relative to the housing such that the pendulums can swing responsive to gravity, orientation of the housing can result in the electronic control PC board transmitting signals to a remote vehicle, craft or virtual subject.

11 Claims, 4 Drawing Sheets

CONTROLLER FOR REMOTE VEHICLES AND CRAFT AND FOR VIRTUAL SUBJECTS

Matter enclosed in heavy brackets [ ] appears in the original patent but forms no part of this reissue specification; matter printed in italics indicates the additions made by reissue.

CLAIM OF PRIORITY

This application claims priority to U.S. Provisional Application No. 60/663,532 filed Mar. 18, 2005, and to U.S. Provisional Application filed in the names of Clayton Ray Golliher of Los Angeles. Calif. and James D. Moore of La Cresenta, Calif. filed by Express Mail on Sep. 1, 2004 and entitled R/C Control Model Steering Wheel, Glove, Ring, Twin and Single Joy Stick, the disclosures of which are incorporated herein by reference.

BACKGROUND OF THE INVENTION

The field of the present invention is controls for remote vehicles, craft and virtual subject matter in video programs.

Advanced radio controlled (RC) vehicles and craft feature both non-proportional and proportional control of various functions, for example aileron and elevator position on airplanes and steering radius on boats and cars. Previous art employs non-intuitive arrangements of levers to operate variable resisters (pots) which send variable electrical signals to servo control electronics to control the vehicle or craft.

SUMMARY OF THE INVENTION

The present invention is directed to a control system which provides directional control over various real and virtual vehicles, craft and moveable subjects.

In a first separate aspect of the present invention, the control system includes a housing, an RC controller having a conventional electronic radio control PC board in communication with tilt switches fixed relative to the housing at preferred orientations. The switches are in communication with control terminals of the electronic radio control PC board. With the tilt switches fixed relative to the housing, orientation of the housing can result in the electronic radio control PC board transmitting signals to a remote vehicle or craft such as land vehicles, boats and aircraft for control thereof. Advantageously, the switches are positioned such that the orientation of the housing provides an intuitive control to the vehicle or craft.

In a second separate aspect of the present invention, the control system includes a housing, a video controller having an electronic video control PC board connected to tilt switches which are fixed relative to the housing. The tilt switches are electrically connected to the control terminals of the electronic video control PC board. Again, the switches may be arranged such that the virtual vehicle in the video display responds to intuitive movement of the housing.

In a third separate aspect of the present invention, the control system includes a housing, an RC controller having an electronic radio control PC board and pots connected to the electronic radio control PC board and having shafts orthogonally arranged relative to the housing. The pots are connected to control terminals of the electronic radio control PC board. Pendulums are fixed to the shafts of the pots. With the pots having shafts orthogonally arranged relative to the housing such that the pendulums can swing responsive to gravity, orientation of the housing can result in the electronic radio control PC board transmitting signals to a remote vehicle or craft such as land vehicles, boats and aircraft for control thereof. Advantageously, the pots are positioned such that the orientation of the housing provides an intuitive control to the vehicle or craft. The pots provide proportional control to the control system.

In a fourth separate aspect of the present invention, the control system includes a housing, a video controller having an electronic video control PC board and pots connected to the electronic video control PC board and having shafts orthogonally arranged relative to the housing. The pots are electrically connected to the control terminals of the electronic video control PC board. Pendulums are fixed to the shafts of the pots. With the pots having shafts orthogonally arranged relative to the housing such that the pendulums can swing responsive to gravity, the pots again may be arranged such that the virtual vehicle in the video display responds to intuitive movement of the housing.

In a fifth separate aspect of the present invention, any of the foregoing aspects may be combined for further advantage.

Accordingly, it is an object of the present invention to provide an improved control system for remote vehicle and craft, both real and virtual. Other and further objects and advantages will appear hereinafter.

DETAILED DESCRIPTION OF THE PREFERRED EMBODIMENTS

Figure 1:
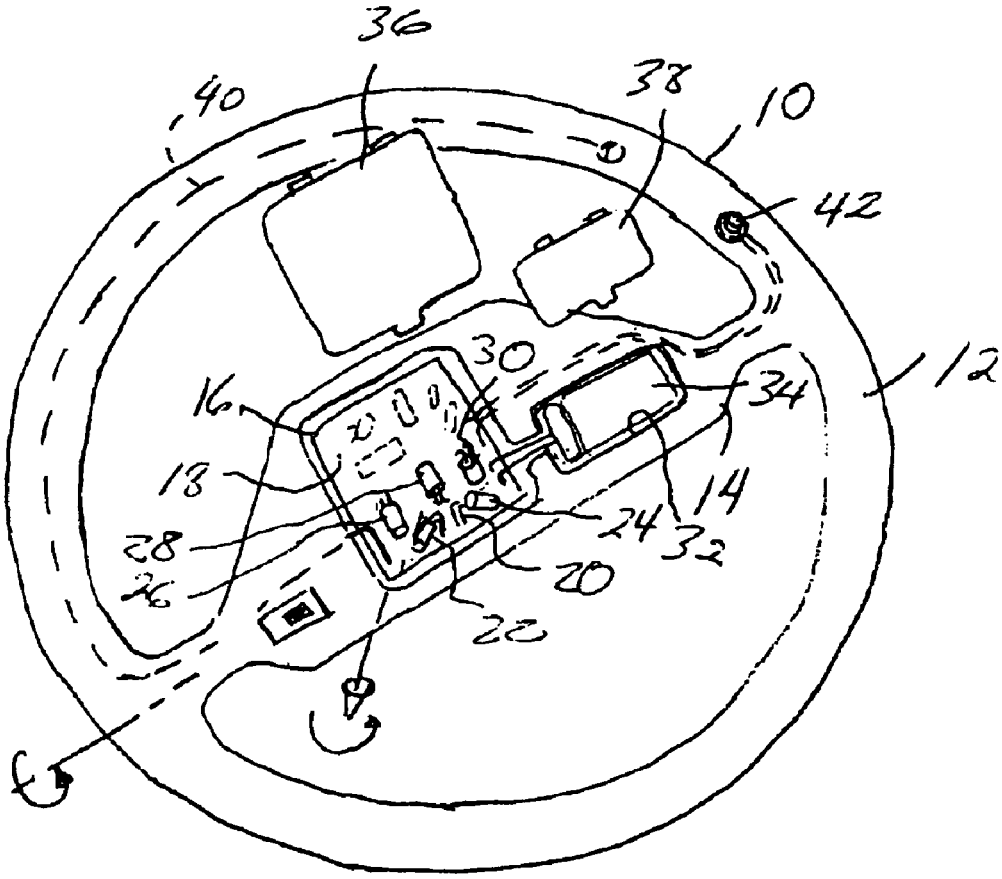
FIG. 1 is a perspective view of a control with portions of the cover illustrated in exploded assembly for clarity.

Turning in detail to the drawings, FIG. 1 illustrates a control system which is used for the remote operation of a vehicle such as an automobile, a truck, a tank, a motorcycle and the like or a craft such as an aircraft, helicopter, flying saucer or boat. Alternatively, the system may be used for virtual subjects on a separate video display, connected by wire or wireless communication, the virtual subjects including the foregoing representative devices, human figures, animals and imaginary depicted objects. The system is shown to include a housing 10 having the appearance of a steering wheel with a wheel 12 and a crossbar 14. Many realistic or fanciful housings 10 may be employed. Certain such housings are illustrated in U.S. Design Pat. Nos. D506,231, D508,542, D508,964, D508,965 and D509,266 and U.S. Design patent application Ser. No. 29/216,607, the disclosures of which are incorporated herein by reference.

The devices shown in these design patents advantageously have an apparent orientation of neutrality where the housing would intuitively indicate that neither a right turn nor left turn is being undertaken. Further, the housing preferably has an apparent forward/aft direction. These differ with the configuration of each housing. The apparent orientation of neutrality and forward/aft direction are achieved in the example of FIG. 1 with the steering wheel tilted forward from the vertical and the crossbar lying on a horizontal axis. With the glove of FIG. 2, the apparent neutrality would be achieved with the glove extending substantially horizontally and the forward/aft direction being parallel with the fingers of the glove. The same would be true of the ring of FIG. 4.

In FIG. 1, the housing 10 defining a steering wheel is shown to include an RC controller 16. Any one of a number of available electronic radio control PC boards 18 is set into the crossbar 14 of the circular wheel 12. The electronic radio control PC board 18 is of conventional design having control terminals 20. These terminals 20 are provided in conventional equipment for control switches which are capable of being actuated to control output of the radio control PC board 18 which, in turn, controls such vehicles and craft as are contemplated here.

In this embodiment, tilt switches are coupled with the conventional control terminals 20. The tilt switches are to be found in a plurality of orientations to provide intuitive operation in controlling a vehicle or craft with the steering wheel housing 10. Each tilt switch has a direction of action in which the switching element moves responsive to that direction being tilted such that one end of the switch moves up or down relative to the other end of the switch. The directions of action of two of the tilt switches 22, 24 are transverse to the apparent forward/aft direction of the housing. The switches 22, 24 are oriented such that rotation of the wheel housing 10 to the left from the apparent position of neutrality will result in the movement of the switching element of one of the tilt switches 22, 24 to a closed state. In turn, a signal from the electronic radio control PC board 18 dictating a left turn of the vehicle or craft results from the closure of that switch. Similarly, tilting the wheel housing 10 to the right from the apparent position of neutrality will result in a right turn control signal.

The apparent orientation of neutrality includes an intuitive pitch of the housing. In the wheel housing 10, that pitch of neutrality is with the plane of the wheel 12 being inclined forwardly from the vertical. With the glove housing of FIG. 2, the pitch of neutrality is with the glove extending horizontally. In these orientations, the vehicle, craft or virtual subject is held at rest. Tilt switches 26, 28, 30 are positioned with their directions of action at fore and aft angles relative to that orientation of neutrality. These tilt switches 26, 28, 30 are arranged such that pitching the housing 10 forward from the apparent orientation of neutrality will result in a forward power signal, pitching the housing 10 back will result in a reverse power signal and pitching the housing 10 even more forward will result in a higher speed forward. Where the craft is an aircraft which does not fly in reverse, the tilt switch actuated when the housing 10 is pitched back may control landing flaps.

The housing 10 is also shown to include a battery compartment 32 with a battery 34 therein. Covers 36 and 38 cover the radio control PC board 18 and the battery 34, respectively. An antenna 40 is shown coupled with the PC hoard 18 and extending about the interior of the wheel 12. A power on-off switch 42 is also coupled with the PC board 18.

Figure 2:
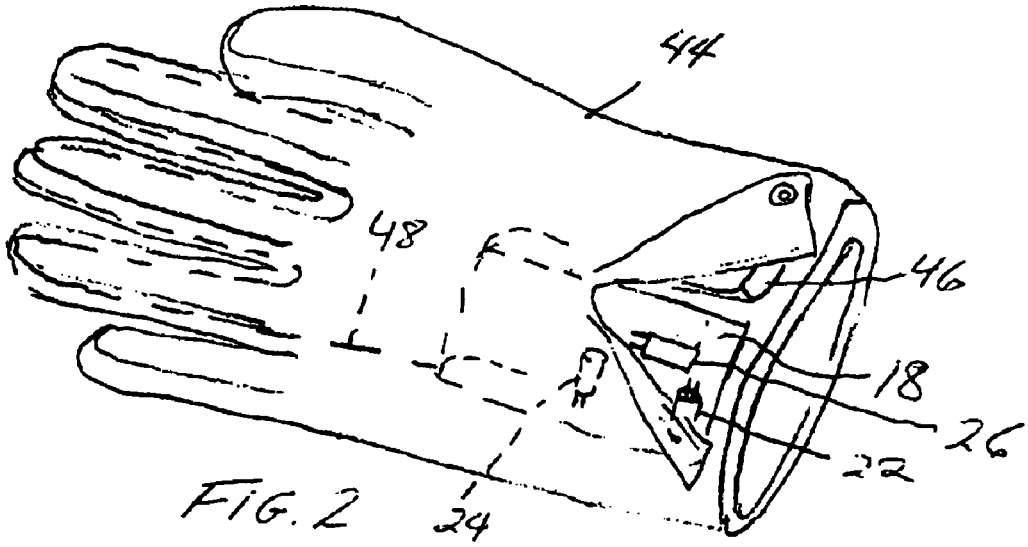
FIG. 2 is a perspective view of a second control.
Figure 3:
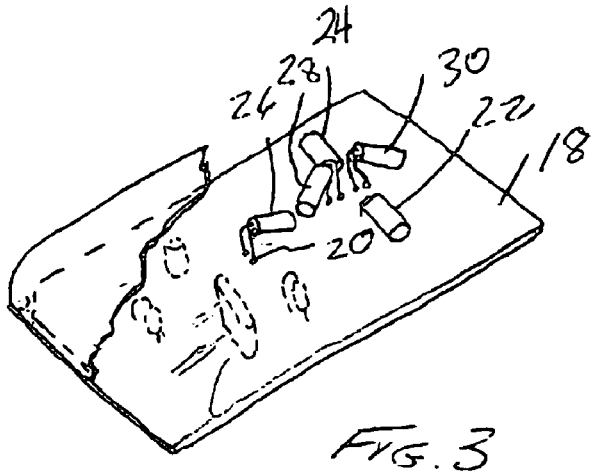
FIG. 3 is a perspective view of an electronic control PC board for RF transmission or video control.

In FIG. 2, the housing 44 is shown to be a glove. The radio control PC board 18 is found between the inner and outer layer of the glove housing 44 along with a battery 46 and antenna 48. One example of a radio control PC board 18 which may be employed with any of the housings is illustrated in FIG. 3. The tilt switches 22-30 are appropriately oriented relative to the board 18 depending on the housing employed and the orientation of the board relative to that housing. In the wheel housing 10 of FIG. 1, the hoard is at an angle to the horizontal in the apparent neutral position. In the glove housing 44, the apparent neutral is with the PC board 18 in a horizontal position.

Figure 4:
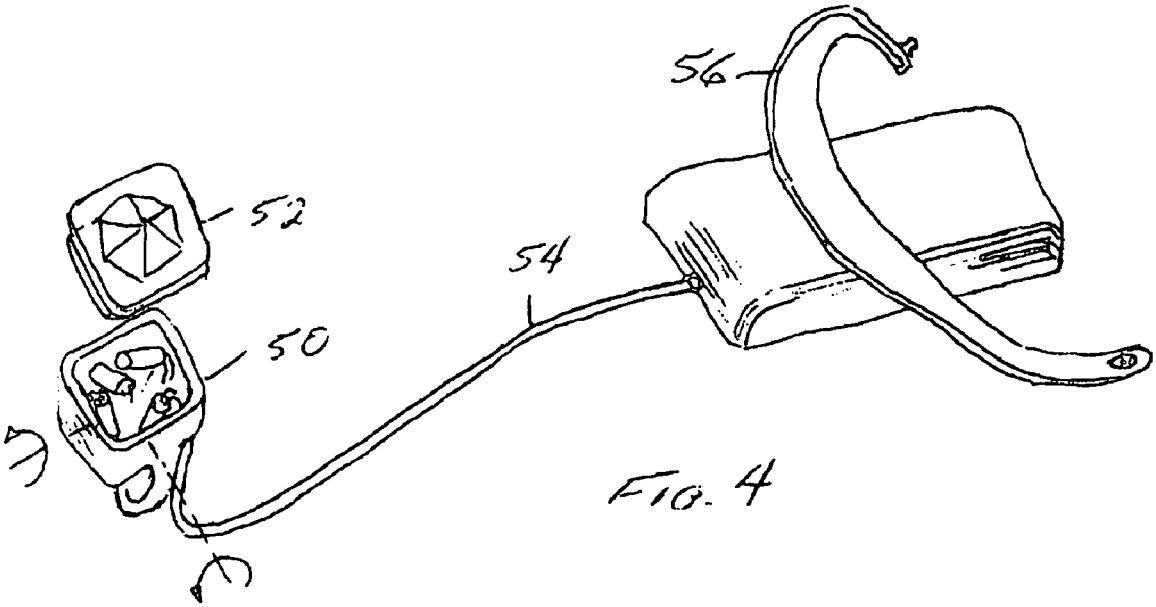
FIG. 4 is a perspective view of another control.

FIG. 4 illustrates yet another housing 50 designed as a ring. The housing 50 includes a cover 52 to cover the tilt switches 22-30. A wire harness 54 extends from the ring housing 50 to a sending unit including a battery and PC board (not shown). A wrist strap 56 retains the radio sending unit in place.

Figure 5:
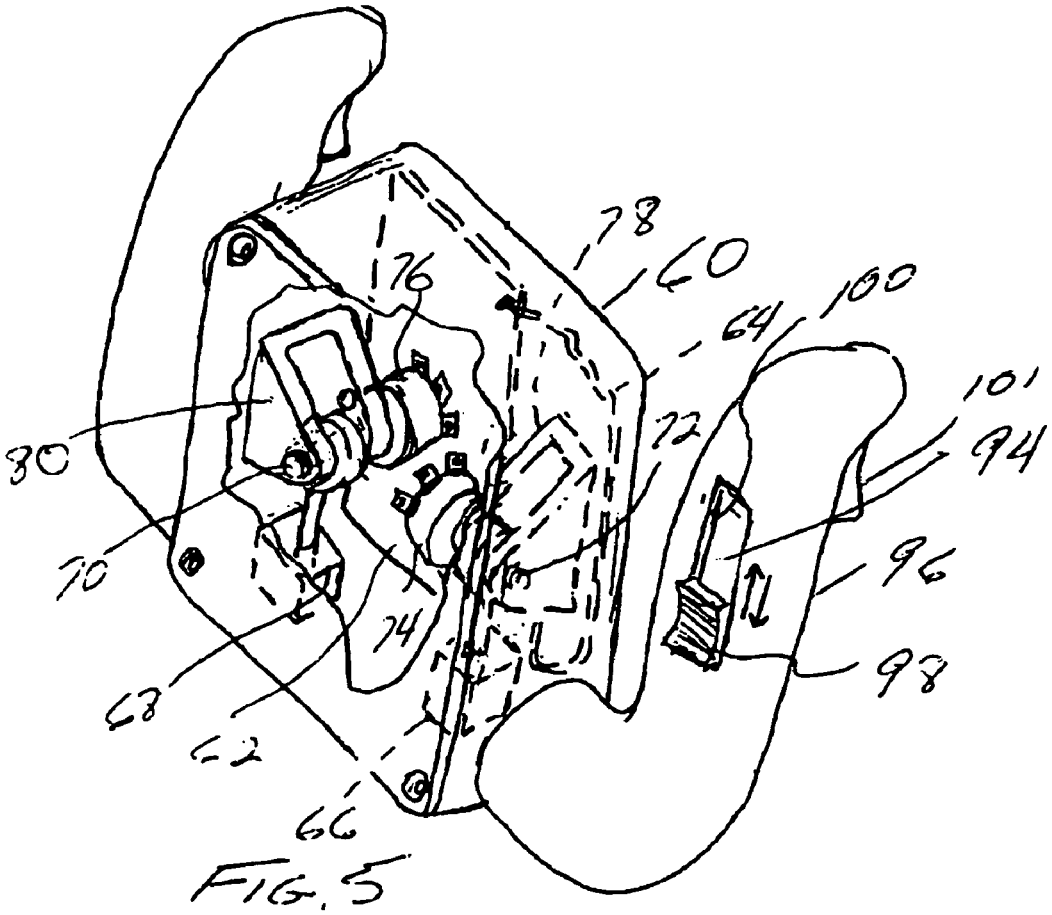
FIG. 5 is a perspective view of a control with portions of the cover broken away for clarity.

FIG. 5 discloses a basic RC controller. The housing 60 has the appearance of a realistic or fanciful control device for a vehicle or craft. In this case, the housing 60 is in the shape of an aircraft control wheel housing 60 enclosing an electronic radio control PC board 62 and an antenna 64. Two internal pendulums 66, 68 are connected to the orthogonally arranged rotatable shafts 70, 72 of two pots (variable resisters) 74, 76. As the control wheel housing 60 is turned left or right and/or tilted toward and away from the operator, the weighted pendulum 66, 68 tend to stay parallel to the force of gravity inducing rotation of the pot shafts 70, 72. Thus the electrical resistance of the pots 74, 76 vary with the angle of rotation of the wheel housing 60 about two axes.

The housing 60 has an apparent orientation of neutrality and an apparent forward/aft direction. One pots 74 includes the shaft 70 which is rotatable about a first axis substantially transverse to the apparent forward/aft direction. The other pot 76 includes the shaft 74 which is rotatable about a second axis substantially parallel to the forward/aft direction. Levers may be retained from conventional devices or added to the housing 60 as redundant controls to be compatible with current controls which may be used when the user would be more comfortable, particularly during training.

To provide impact resistance to the system, the shafts 70, 72 are shown to each be rotatably mounted in a clevis 78, 80 affixed to the wall of the housing 60. The pendulums 66, 68 are fixed to the shafts 70, 72 to rotate the shafts 70, 72 relative to the pots 74, 76.

The shaft 70 would typically control an elevator on a model aircraft such that the aircraft nose would rise proportionally as the upper portion of the control wheel was tilted toward the operator, in the same manner as an actual aircraft. Likewise the shaft 72 could readily be employed to simultaneously and proportionally activate the ailerons and rudder of the aircraft to steer the model left or right as the control wheel housing 60 was turned left or right.

The device of FIG. 5 replaces the conventional controls for a vehicle or craft which already has proportional controls including pots actuated by levers. The pots 74, 76 in the device of FIG. 5 may be those conventionally used in an existing design but are now associated with the pendulums 66, 68 as show and placed in a new housing 60. The pendulums 66, 68 are mounted in the housing 60 to respond in an intuitive manner to attitude adjustment of the housing 60. Thus, the control electronics, communication equipment and vehicle or craft are anticipated to remain of conventional design well known to those of skill in the art of RC models and toys.

Figure 9:
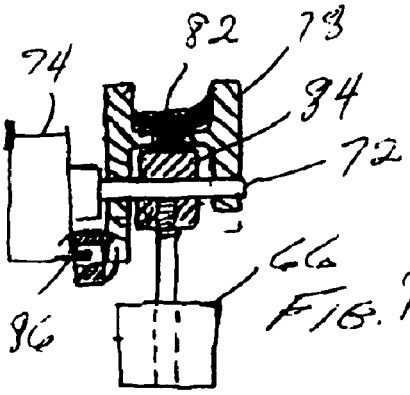
FIG. 9 is a cross-sectional side view of a pendulum associated with a pot.
Figure 10:
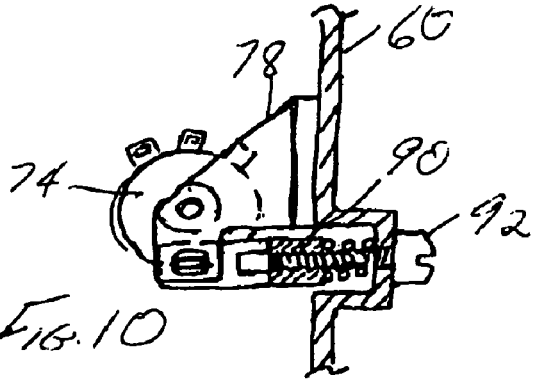
FIG. 10 is a side view of the pendulum of FIG. 9 in partial cross section.

The details of one example of a pendulum driven pot 74 is illustrated in detail in FIGS. 9 and 10. This device is shown to include damping such as through the use of damping grease 82 against the hub 84 of the pendulum 66 with there being a small gap for the grease 82 between the hub 84 and the clevis 78 to eliminate second order vibrations as well as to damp undesired momentum.

It is desirable to readily trim servo operated mechanisms to compensate for a build up of manufacturing errors which might allow airplane ailerons or a boat rudder to steer left or right even when the steering control is held in a neutral position. FIGS. 9 and 10 discloses sub-assembly with the a simple screw operated adjustment mechanism which the operator employs to conveniently adjust and bias the pot via the anti-rotation pot tab, and thus trim ailerons, elevator, a boat rudder and the like as desired. The pot 74 is tied to the clevis 78 by an anti-rotation tab 86. The tab 86 on the pot 74 is held in a tab holder 88 which is on a nut 90 that is controlled by an adjustment screw 92. This arrangement allows for trim adjustment.

While the pendulum 68 would typically be used to control pitch attitude via an elevator control surface of the more complex RC model planes, it could be used as a throttle control in simpler RC model planes which employ motor throttling to ascend or descend. For example, one commercially available plane presently employs only two lever operated pots, one of which controls "tail ailerons" for steering left or right while the second pot throttles the motor to control altitude. Thus pendulums 66, 68 would control this model.

In slightly more complex models, an independent tail elevator is employed while the rudder position is changed automatically with wing aileron position, thus requiring pendulums 66, 68 for these functions and a pot to throttle motor speed. A linear throttle 94 shown in FIG. 5 consists of a linear pot attached inside the handle 96 of the aircraft control wheel 60 with a thumb button 98 attached thereto. The button 98 protrudes through a slot 100 in the handle 96 for convenient movement by the operator. Yet more complicated RC controls such as are used in airplanes capable of precise, unusual and realistic acrobatic maneuvers have independent controls for throttle, elevator, rudder and ailerons. Orthogonal pots 74, 76 would, however, be the only pendulum driven pots. A trigger 101 might alternatively be used as a throttle or provide other functions.

Figure 6:
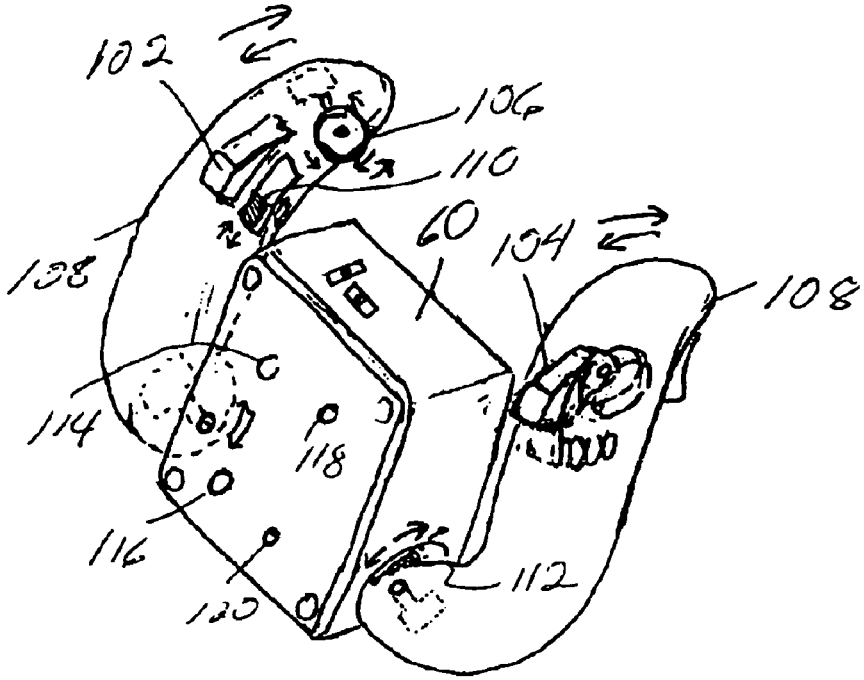
FIG. 6 is a perspective view of another embodiment of a control.
Figure 8:
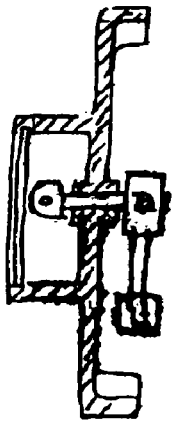
FIG. 8 is a cross-sectional side view taken along line 8-8 of FIG. 7.
Figure 11:
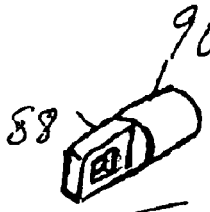
FIG. 11 is a perspective view of a nut with a tab holder employed in the assembly of FIG. 10.

FIG. 6 discloses additional control mechanisms for a high end radio controlled plane using the same pendulums of FIG. 5 (not shown in FIG. 6). Two protruding spring loaded thumb operated rudder control buttons 102, 104 activate small pots enclosed within the handles. The operator could then control rudder independent of ailerons to execute unusual maneuvers where one wishes to employ rudder without aileron to yaw the aircraft into a wind for example, without banking left or right, or to execute unusual and complex aerobatic maneuvers where one might atypically employ left rudder with right aileron.

A ratcheted wheel 106 provides an optional throttle. The wheel 106 connects to a pot within the handle 108 and gives proportional control. The wheel 106 is operated with the thumb of the operator. A sliding, ratcheted or not, thumb control 110 also provides an alternate throttle. This control operates or adjusts a linear pot within the handle 108.

Also in FIG. 6, the left and right handles 108 are hinged with springs 112 to keep them in place. As the operator proportionally pulls one of the handles 108 back, a pot is adjusted and gives proportional control to turn left or right rudder, or to turn the tail rudder left or right. On the front panel, 114 is a throttle trimmer, 116 is a trimmer for lift and right rudder, 118 is a trimmer for left and right aileron and 120 is a trimmer for up and down elevator.

Figure 7:
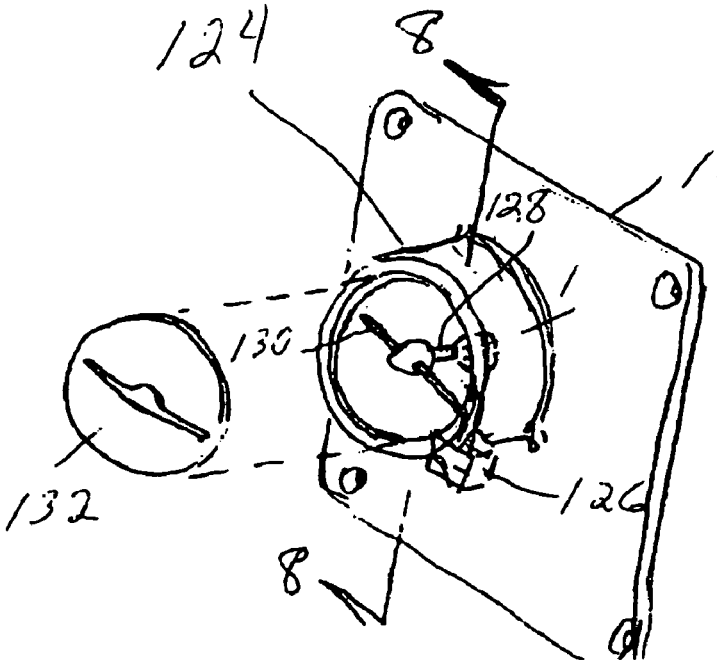
FIG. 7 is a perspective view of an alternate cover for a control housing with the face in exploded assembly.

FIG. 7 discloses an alternate cover 122 for the control housing 60 having an integral "artificial horizon" indicator 124 employing a third relatively small weighted pendulum 126 attached to a shaft 128. The pendulum 126 keeps the shaft 128 fixed relative to gravity direction, while the steering housing 60 and cover 122 are rotated by the operator. A small indicator pointer 130 fixed to the shaft 128 is thus held perpendicular to the direction of gravity while a clear lens 132 containing a printed representation of the aircraft wings rotate as the housing 60 is rotated.

The use of proportional pots gives the operator the ability to control asserted vehicles such as cars, jets, sailboats, motor boats, planes (all types), helicopters, (all sizes), flying saucers, flight train simulator for RC planes, helicopters, all other vehicles including such devices as motorcycles, ATVs, jet skis, snow mobiles, bikes and tanks.

The same controllers can also be coupled with the standard controls of a video game for proportional control of virtual devices. The controller housing can reflect the virtual device being controlled in such games such as vehicles and crafts, guns and even virtual animate objects or the traditional controller for the devices depicted such as steering devices for vehicles and craft. The PC board 18 equally illustrates a electronic video control PC board making the housings 10, 44, 46, 60 into video controllers. Again, proportional control can be achieved with two orthogonally disposed pots with weighted pendulums for control relevant to the virtual subject matter of the video game or simpler controls can use non-proportional tilt switches. Other pots and switches, as applied in the preceding applications, can also be conveniently located for additional control.

Thus, improved controllers for remote vehicles, craft and virtual moveable subjects have been disclosed. While embodiments and applications of this invention have been shown and described, it would be apparent to those skilled in the art that many more modifications are possible without departing from the inventive concepts herein. The invention, therefore is not to be restricted except in the spirit of the appended claims.

What is claimed is:

1. A control system for the remote operation of vehicles and craft, comprising a housing;

an RC controller including an electronic radio control PC board of the type having control terminals for receipt of actuated proportional control resistances for signal output control of the radio control PC board and an antenna;

pots having shafts orthogonally arranged relative to the housing, the pots being fixed relative to the housing and electrically connected to the control terminals of the electronic radio control PC board; *and* pendulums fixed to the shafts of the pots, respectively, and movable relative to the housing.

2. The control system of claim 1, the housing having the appearance of a realistic or fanciful control device for a vehicle or craft, an apparent orientation of neutrality and an apparent forward/aft direction, the pots including a first pot the shaft of which is rotatable about a first axis substantially transverse to the apparent forward/aft direction and a second pot the shaft of which is rotatable about a second axis substantially parallel to the forward/aft direction.

3. The control system of claim 2, the first pot providing apparent variable forward motion, the second pot providing apparent left and right turns, respectively.

4. The control system of claim 2, the first pot providing apparent variable pitch, the second pot providing apparent left and right banks, respectively.

5. The control system of claim 4 further comprising a variable apparent throttle switch operatively located on the housing and electrically connected to the control terminals.

*6. A control system for the remote operation of vehicles and craft, comprising:*

*a housing;*

*an RC controller including an electronic radio control PC board of the type having control terminals for receipt of control resistances for signal output control of the radio control PC board and an antenna;*

*a pot having a shaft being fixed relative to the housing, the pot being fixed relative to the housing and electrically connected to the control terminal of the electronic radio control PC board, the pot adapted to facilitate a proportional control; and*

*a pendulum fixed to the shaft of the pot, respectively, and movable relative to the housing.*

*7. The control system of claim 6, the housing having the appearance of a realistic or fanciful control device for a vehicle or craft, an apparent orientation of neutrality and an apparent forward/aft direction, wherein the pot fixed to the shaft is rotatable about an axis substantially transverse to the apparent forward/aft direction.*

*8. The control system of claim 6, the housing having the appearance of a realistic or fanciful control device for a vehicle or craft, an apparent orientation of neutrality and an apparent forward/aft direction, wherein the pot fixed to the shaft of is rotatable about an axis, substantially parallel to the forward/aft direction.*

*9. The control system of claim 6, wherein the pot provides apparent variable forward motion.*

*10. The control system of claim 6, wherein the pot provides apparent left and right turns, respectively.*

*11. The control system of claim 6 further comprising a variable apparent throttle switch operatively located on the housing and electrically connected to the control terminals.*

* * * * *